(12) United States Patent
Weber et al.

(10) Patent No.: US 6,286,517 B1
(45) Date of Patent: Sep. 11, 2001

(54) FINGERNAIL AND TOENAIL DECORATION USING INK JETS

(75) Inventors: Paul J. Weber, Ft. Lauderdale; Michael R. Weber, Clearwater, both of FL (US); Luiz B. Da Silva, Danville, CA (US)

(73) Assignee: Pearl Technology Holdings, LLC, Clearwater, FL (US)

( * ) Notice: Subject to any disclaimer, the term of this patent is extended or adjusted under 35 U.S.C. 154(b) by 0 days.

(21) Appl. No.: 09/583,008

(22) Filed: May 26, 2000

Related U.S. Application Data (63) Continuation-in-part of application No. 09/366,610, filed on Jun. 18, 1999, now Pat. No. 6,067,996, which is a continuation-in-part of application No. 09/218,579, filed on Dec. 22, 1998, now Pat. No. 5,931,166.

(51) Int. Cl.[7] .................................................. A45D 29/00
(52) U.S. Cl. ........................... 132/73; 132/200; 132/285; 700/161
(58) Field of Search ............................... 132/73, 200, 285, 132/73.6, 75.3, 75.4, 73.5; 606/116, 2, 9, 10, 11; 128/898, 395, 398, 776; 347/70, 71, 94, 68, 40; 700/161

(56) References Cited

U.S. PATENT DOCUMENTS

| | | | | |
|---|---|---|---|---|
| 4,575,805 | * | 3/1986 | Moermann et al. | 128/776 |
| 4,742,464 | * | 5/1988 | Duret et al. | 364/474 |
| 5,309,365 | * | 5/1994 | Sullivan et al. | 132/75.4 |
| 5,376,956 | * | 12/1994 | Nagao et al. | 346/157 |
| 5,782,249 | * | 7/1998 | Weber et al. | 132/73 |
| 5,931,166 | * | 8/1999 | Weber et al. | 132/73 |
| 6,067,996 | * | 5/2000 | Weber et al. | 132/73 |

\* cited by examiner

Primary Examiner—Pedro Philogene
(74) Attorney, Agent, or Firm—John P. Wooldridge (57) ABSTRACT

Inkjet printing technology is used to apply selected designs on fingernails or toenails. The nail-printing device applies highly detailed, customized, multicolored designs that are scaled to precisely fit within the boundary of each individual nail. The device comprises an ink jet print head, a holder for aligning the digits or nails, a camera to image the nails, a computer to acquire, store and analyze the image, and a control system that directs the ink jet print head to apply the scaled design to the nails.

65 Claims, 9 Drawing Sheets

FINGERNAIL AND TOENAIL DECORATION USING INK JETS

This application is a continuation-in-part of U.S. patent application Ser. No. 09/366,610, U.S. Pat. No. 6,067,996 filed Jun. 18, 1999 now titled "Nail Decoration Using Ink Jets" incorporated herein by reference, which is a C.I.P. of application Ser. No. 09/218,579 filed Dec. 22, 1998 now U.S. Pat. No. 5,931,166 incorporated herein by reference.

BACKGROUND OF THE INVENTION

1. Field of the Invention

The present invention relates to a device and method for decorating fingernails and toenails with customized, detailed, multicolored designs using inkjet printing technology.

2. Description of Related Art

The conventional decoration of fingernails and toenails involves the use of nail polishes, which are applied using a small brush. Decals or appliques can be applied to the polished surface; these are typically affixed to the nail with glue or by the addition of a topcoat of clear polish. Airbrush painting through a stencil has been used to apply designs to nails. Artificial nails or nail tips applied to the natural fingernails are also used to provide decoration. U.S. Pat. No. 5,309,365 describes a system for cutting artificial nail tips and decorating them using automated cutting processes.

Recently inkjet technology has been suggested as a viable technique for placing decorations on fingernails. See U.S. Pat. No. 5,931,166, titled "Fingernail Decorating" and WO99/33372, titled "Nail Art Method And Device" which describe inkjet systems that are designed for putting a selected design on an individual finger. Although these approaches are superior to the traditional manual techniques, they still have the drawback of requiring the user to manually position each finger and then adjust the size of the decoration to fit within a specified rectangular region. These processes can be time consuming and lead to a less than optimum decoration. In addition, these systems are not suitable for applying colors, gradients and design patterns to the full nail surface because of the varying size and geometry of fingernails and toenails. There is a need for a device that can, with minimal user interaction, accurately apply to natural fingernails or artificial nails a highly detailed, multicolored, customized nail design that covers the entire nail and does not overlap onto the skin unless a user so desires.

SUMMARY OF THE INVENTION

An object of the present invention is to provide a device that applies user selected designs precisely scaled to one or multiple fingernails or toenails simultaneously using inkjet printing technology.

It is another object of the invention to provide technology that covers any desired portion of a nail, including the entire nail without overlapping the skin adjacent to the nail unless a user so desires.

Other objects of the invention will be apparent from the disclosure of the invention that follows.

The device applies customized, highly detailed, multicolored designs that are scaled to the size and shape of the each nail. The device comprises an ink jet print head, a holder for maintaining the digits or nails in the proper position or alignment, a camera to image the nails, a computer with memory to acquire and store images of nails and store digital forms of all possible designs, and a control system that directs the ink jet print head to apply the scaled designs to each nail.

The nail designs are stored in electronic (i.e., digital) form in the computer and are manipulated electronically by software to scale the design (i.e., reduce and/or enlarge the design) in one, two, or three dimensions to fit the individual nail. Some designs are pre-made, entered into the computer, and can be viewed on a display monitor for selection by the subject These pre-made designs may be altered electronically, according to the subject's taste, before the designs are applied. For a customized design, the subject may provide the design or image in an electronic form or in a form that can be scanned and converted into an electronic form that is fed into the computer. Uniquely, in addition to images or designs, the user can select color gradients or shading. The user can select one design for all nails or different design for each nail.

To apply the design to the nail, the digit or digits are placed in a holder that is designed to accommodate up to eight fingers or two thumbs. An alternative holder is designed to accommodate up to ten toes. An optical system within the device images the nails onto an electronic camera (e.g., a CCD). These images are transferred to a computer that analyzes the images to identify the nail surface for each digit. A pre-selected design in the control system for each nail is then scaled and extrapolated to fit the individual nail. An ink jet print head is connected to and controlled by the computer and electronic control system, which sends a signal to the print head. This print head contains an array of ink jet nozzles, which fire the ink at points on the nails as directed by the control system. The control system directs the print head to scan across all the nails to be treated in two or three directions and print the desired design on each nail. Ink jet printing technology is well known and commercially available.

The ink jet print head may remain stationary while applying the design to the nail, but is typically translated over all the nails while the digits are held stationary in the holder. Translation is typically in two directions (across the length and width of the nail), but the print head can also be translated in the vertical direction. Due to drift and variation in the ejection angle of individual inkjet drops, translation in the vertical direction is necessary when high spatial resolution is desired.

Other objects and advantages of the present invention will become apparent from the following description and accompanying drawings.

BRIEF DESCRIPTION OF THE DRAWINGS

The accompanying drawings, which are incorporated into and form part of this disclosure, illustrate embodiments of the invention and together with the description, serve to explain the principles of the invention.

DETAILED DESCRIPTION OF THE INVENTION

The object of the present invention is to provide a device that applies user selected designs to one or multiple fingernails or toenails simultaneously using inkjet printing technology. The device applies customized, highly detailed, multicolored designs that are scaled to the size and shape of the each nail. The device comprises an ink jet print head, a holder for maintaining the digits or nails in the proper position or alignment, a camera to image the nails, a computer with memory to acquire and store images of nails, store digital forms of all possible designs, and including a computer program to analyze the anatomy of each nail and scale the chosen design to fit the nail, and a control system that directs the ink jet print head to apply the scaled designs to each nail.

The ink jet print head is translated over the nail while the digits are stationary in the holder. The translation is typically in two directions—across the length and width of all the nails to be decorated. The print head can also be translated in the vertical direction, along the depth (or height) of the nail. This vertical translation is beneficial for printing high-resolution images, particularly with highly contoured nail surfaces.

The nail designs are stored in electronic form (e.g., digital) in the computer and are manipulated electronically to scale the design (i.e., reduce, enlarge) in one, two, or three dimensions to fit the individual nail. The computer and control system corrects for the curvature of the nail to optimize the appearance of the nail image. The two-dimensional image may seem distorted, but the final image printed on a highly contoured, three-dimensional nail does not appear stretched or distorted.

Some nail designs can be pre-made and entered into the computer, where they can be viewed on a display monitor connected to the control system for selection by the subject These designs may include holiday images and common symbols such as flags, flowers, animals, celestial objects, astrological symbols, initials, cartoon characters, logos of sport teams, and famous works of art They can also include simple multicolored shading or gradients. Uniquely with this invention, even the pre-made designs can be altered electronically somewhat in form or different colors selected, according to the subject's taste, before the designs are applied.

For a customized design, the subject may provide the design or image in an electronic form or in a form that can be scanned and converted into an electronic form that is fed into the control system. These personalized designs can include photographs of people or scenery, logos of local teams, and names. French nail designs that segment the nail surface into different areas that are colored differently can also be applied.

Figure 1A:
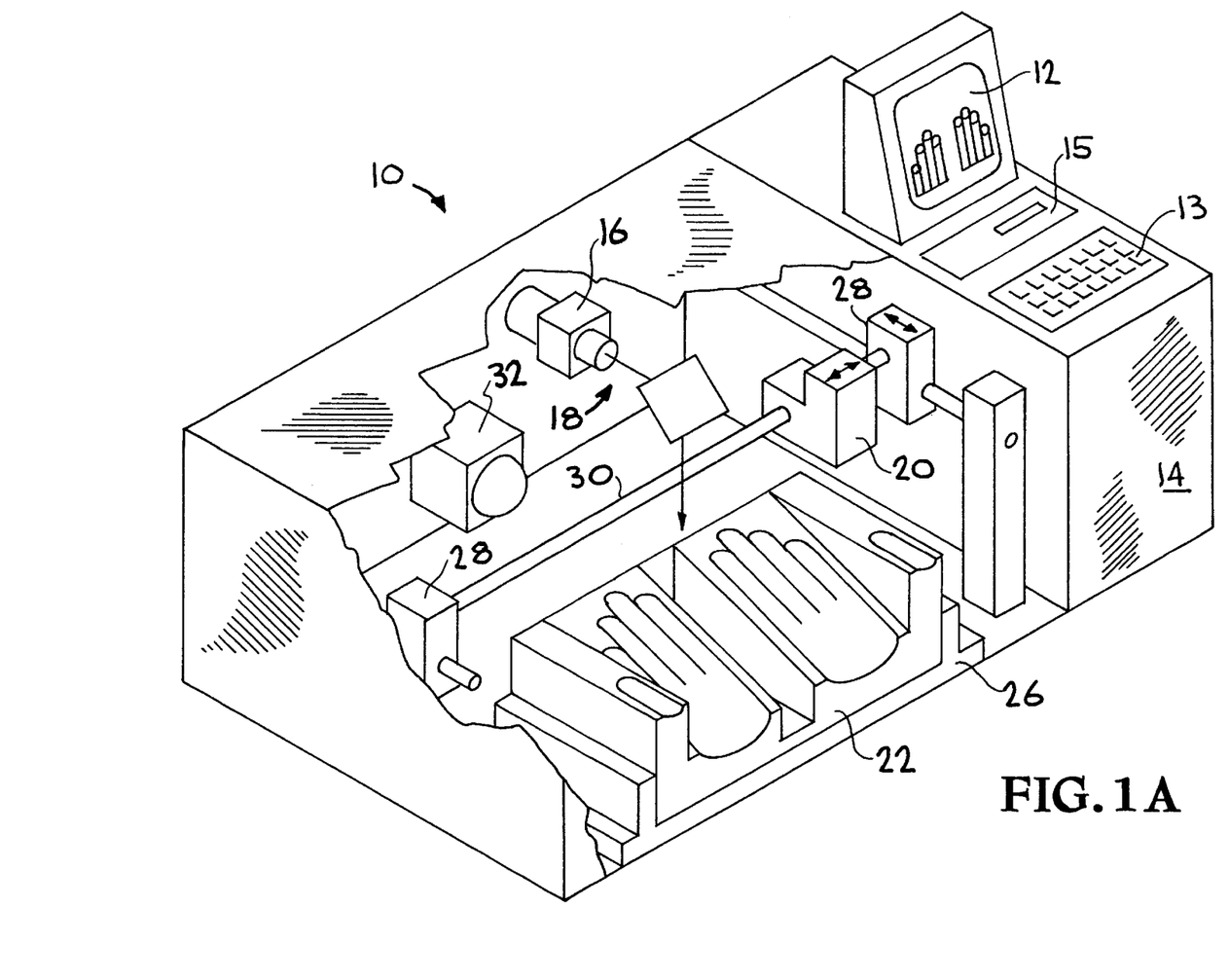
FIG. 1A shows an embodiment of the present invention nail printing device.
Figure 1B:
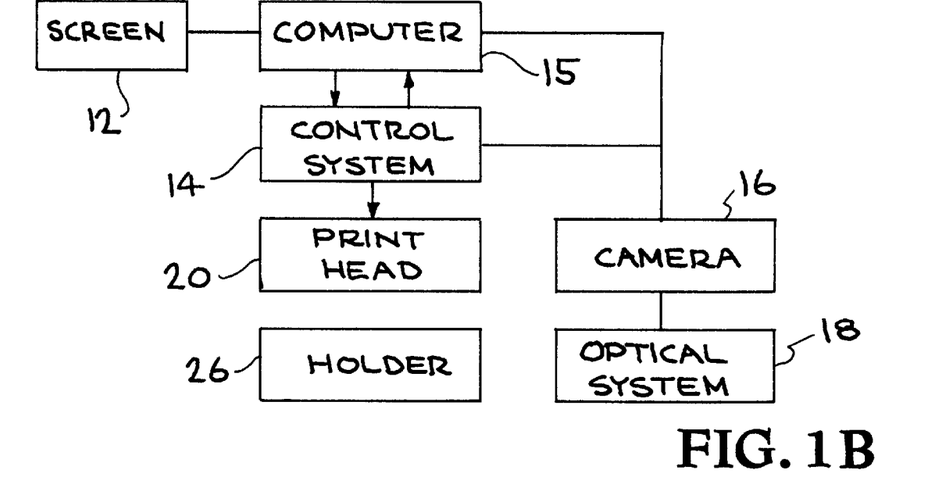
FIG. 1B illustrates the embodiment of FIG. 1A in block diagram form.

FIG. 1A shows one embodiment of the nail decoration device according to the present invention. The device 10 consists of a computer 15 that controls an electronic control system 14. The electronic control system 14 is responsible for communicating device settings to the computer and translating computer print commands into electrical signals that activate the print head 20. The computer display screen 12 guides the user through the entire process including design selection and is used to display the image of the digits. The image is acquired by the computer 15 using the camera 16 and optical system 18. An ink jet print head 20 is connected to and controlled by the control system 14, which is integrally connected to the holder stage 26 and print head 20 in this embodiment The image of the digits is analyzed by software in the computer 15 using a combination of color selection and edge detection algorithms, discussed below, to clearly identify the nail surface and boundary. The identified nail surface boundaries are displayed on the computer screen 12 by colored lines (solid or dashed or dotted) that overlay the actual nail image on the camera image. The user can manually modify the boundaries using the keyboard 13 or other input device such as a mouse or touchpad. In this way the user can select to print the design beyond the nail boundary and print on skin as well, if so desired. The preselected designs are scaled by the computer 15 to fit within the selected boundary of each individual digit Computer 15 sends the print commands to the electronic control system 14 that sends the necessary signals to the print head 20, causing it to scan across all the digits to be decorated and apply or print the desired design on each surface. FIG. 1B illustrates the embodiment of FIG. 1A in block diagram form. As discussed above, computer 15 is connected to control system 14, which collects and communicates nail image data obtained from camera 16 and optical system 18. Alternately, camera 16 and optical system 18 may be directly connected to computer 15. Control system 14 also communicates print head 20 settings to computer 15. Screen 12, connected to computer 15, is used to display the nail images from holder 26 and the designs on screen 12.

Figure 4A:
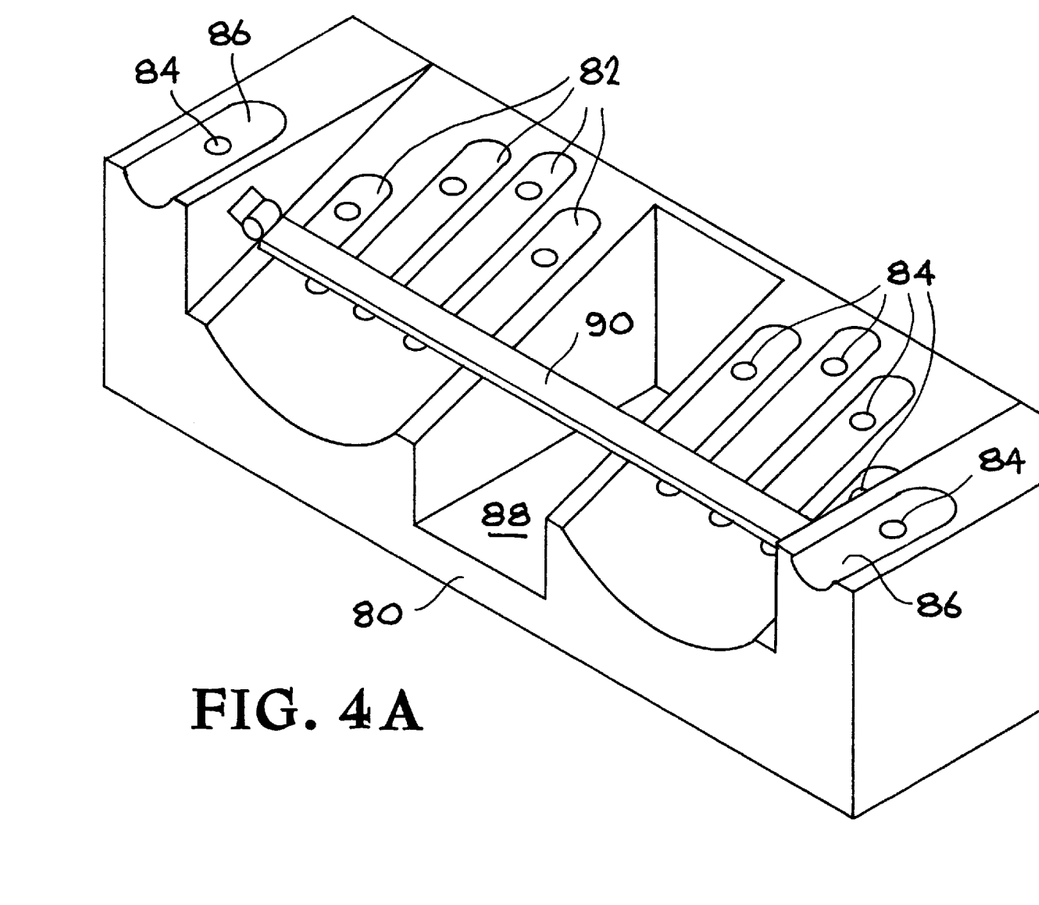
FIG. 4A shows a holder with indentations for the fingers thumbs and palms.

The holder 22 is mounted on the holder stage 26 and can have a sensor 84, shown in FIG. 4A, in each digit position that signals to the control system that a digit is present The sensors can be electrical and detect the change in capacitance or resistance. The sensors can also be a light detector that detects the change in light when it is blocked by the digit The computer program can use the sensor information to identify that digits are to be decorated automatically without user input In addition, the height of the holder is adjusted by the control system 14 using motors to drive the translation stage 26 until the nail surface is at the optimum height Instead of motors a standard mechanical drive could be driven manually to adjust the height. The optimum height can be identified by a mechanical reference that is placed temporarily above the fingers and contacts the fingers when they are at the proper position. Alternatively, the optimum height can be detected by a combination of collimated light and optical detectors that are located on either side of the holder. The collimated light beam would cross above the digits and hit the detector when the digits were below the optimum height When the digits were above the optimum height the detector would have minimal signal. When the beam is half blocked (i.e., 50% signal level) the holder and digits are at the optimum height Another alternative to detect the optimum height would use the image collected by the camera 16 that is adjusted to be focused on the nail surface when it is at the optimum height The best focus can be determined by measuring the nail edge pixel width as the holder is scanned vertically. The holder 22 can either be held magnetically or with quick connecting lock screws in the holder stage 26. This makes it very easy to swap in different holders that are easily optimized for a different hand or foot size.

The device includes scanning means 28, 30 that permit the print head 20 to scan across the nail in two directions. Translating in the vertical direction can also be included to maintain the ink jet to nail surface distance constant and thereby improve the resolution of the printed design. Vertical translation of the print head 20 eliminates the need to position the nail surface for all fingers at approximately the same height. Scanning mechanisms usable in the present invention are known in the art and are used in commercially available ink jet printers. Examples of scanning mechanisms and the mechanical linkage usable in the present invention are disclosed in U.S. Pat. No. 5,975,677 and U.S. Pat. No. 6,033,064, incorporated herein by reference. Examples of inkjet technology are disclosed in U.S. Pat. No. 6,053,601, titled "Ink Jet Printer," U.S. Pat. No. 4,855,752, U.S. Pat. No. 4,967,203 and U.S. Pat. No. 5,376,956, the disclosures all of which are incorporated herein by reference.

An optional heat lamp 32 can be activated after printing to speed the drying of the ink on the nail surface. Rather than a heat lamp, a hot air blower could also be used.

Although the preferred embodiment has the computer, control system and scanning unit integrated into a compact unit, an alternative embodiment could have the computer and display monitor connected by a cable to a remote nail printing device.

Figure 2:
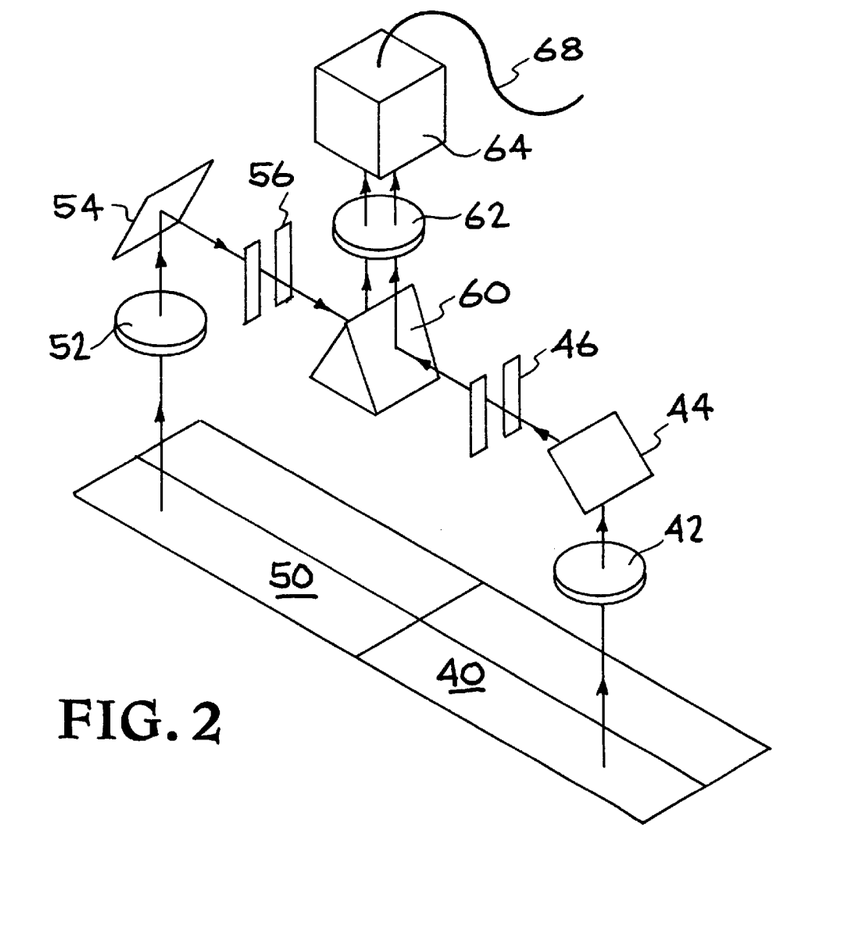
FIG. 2 shows a detailed view of one possible camera and optical imaging system according to the present invention.

FIG. 2 shows a detailed view of one possible camera and optical imaging system that maximizes the number of fingers and spatial resolution of the image. This camera system may replace camera 16 and optical system 18 of FIG. 1. Conventional low cost CCD cameras have an image region with approximately 400 pixels by 400 pixels. In order to achieve the 0.010 inch spatial resolution desired over the wide 8 inch field, it is necessary to break up the image field into two 4 inch by 2 inch fields which are displaced on the CCD to cover the entire 8 inch by 2 inch field. In this embodiment, the area 40 is imaged by lens 42 and relayed to an image plane by mirror 44. At the image plane an aperture 46 transmits only half of the image. The mirror 60 relays this half of the image through lens 62 which images the aperture onto half of the CCD chip in camera 64. Similarly, the area 50 is imaged by lens 52 and relayed to an image plane by mirror 54. At the image plane, an aperture 56 transmits only half of the image. The mirror 60 relays this half of the image through lens 62 which images the aperture onto the other half of the CCD chip in camera 64. A cable 68 connects the camera to the computer and control system. In order to simplify image interpretation by the user on the computer screen, the computer software separates the two image segments and displays them in the natural orientation. An alternative optical system would use two separate CCD and optical systems to image a larger 8 inch by 4 inch field. Alternatively, a single high-resolution CCD with more pixels (e.g., 800 by 800) could be used in the device.

Figure 3A:
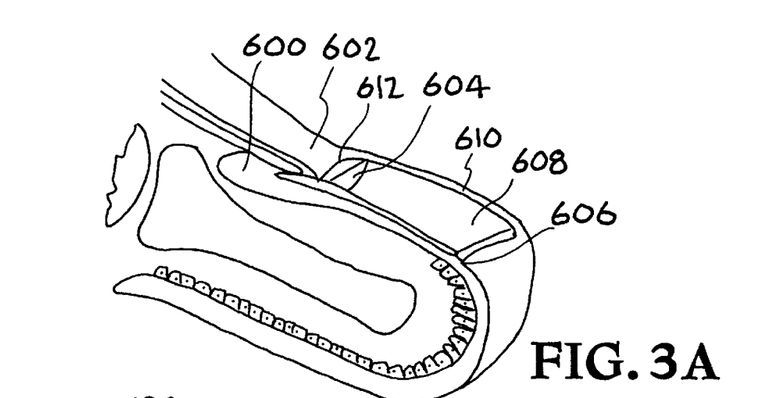
FIGS. 3A–3F show the complex human nail anatomy.
Figures 3B, 3E, 3F:
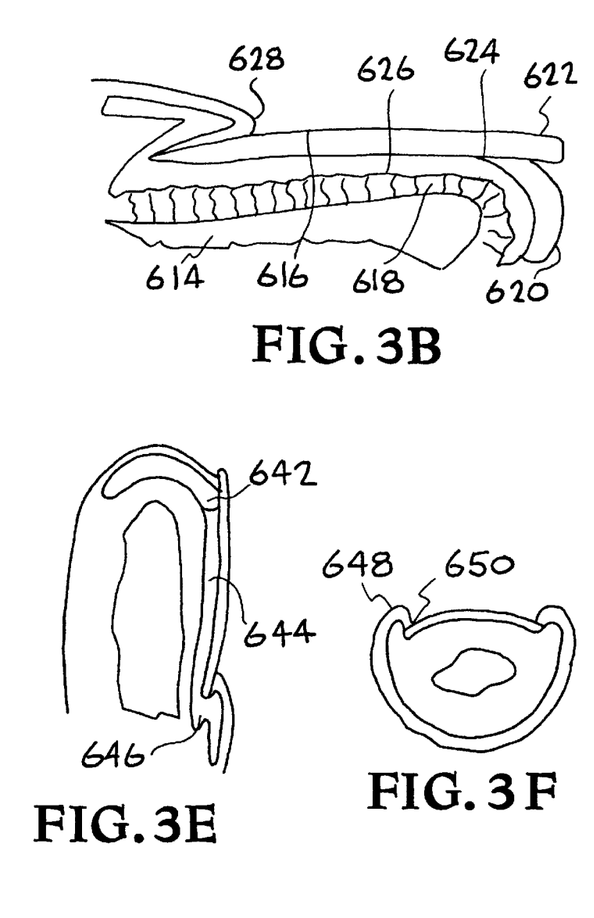
Figure 3C:
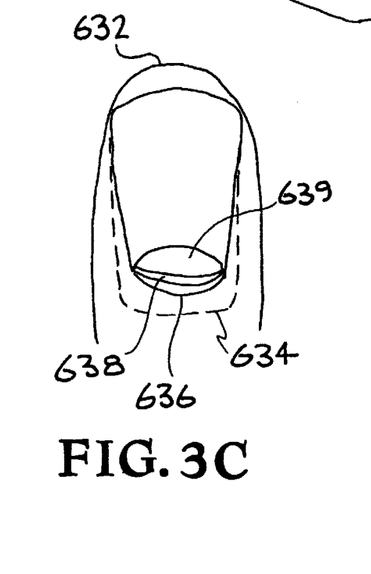
Figure 3D:
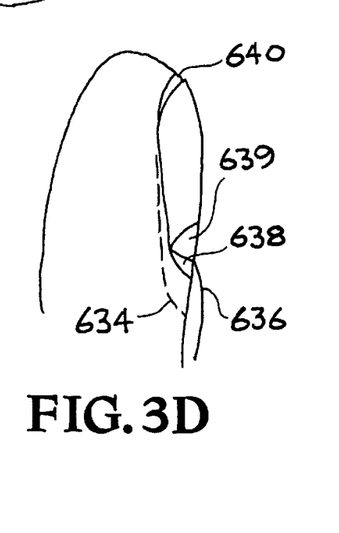

FIGS. 3A–3F show the complex human nail anatomy. Referring to FIG. 1A, the nail comprises a nail matrix 600, a posterior nail fold 602, the lunula 604, the hyponychium 606, nail plate 608, lateral nail fold 610 and cuticle 612. FIG. 1B further illustrates the human nail, showing bone 614, the distal margin of the lunula 616, the vertical collagen fibers 618, epidermis 620, nail plate 622, hyponychium 624, nail bed 626, cuticle 628 and epidermis 630. FIGS. 3C and 3D show a top view and side view respectively, illustrating distal edge 632, proximal edge 634, proximal nail fold 636, cuticle 638 and lunula 639. FIG. 3D also shows distal groove 640. FIG. 3F is a cut-away side view of a fingernail and illustrates the hyponychium 642, nail bed 644 and matrix 646. FIG. 3F shows an end view illustrating the lateral nail fold 648 and the lateral nail groove 650.

Figure 3G:
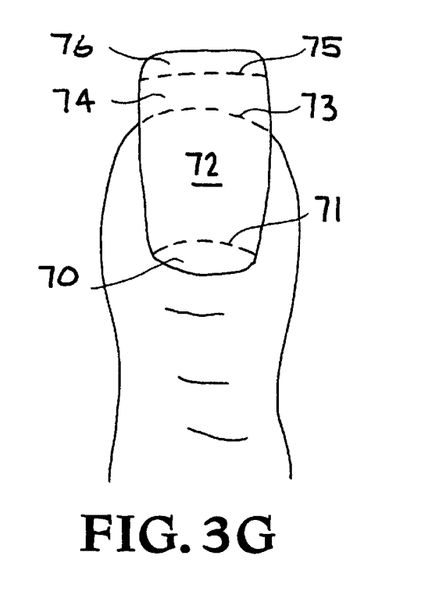
FIGS. 3G and 3H show how the fingernail surface is segmented for French nail design decoration.
Figure 3H:
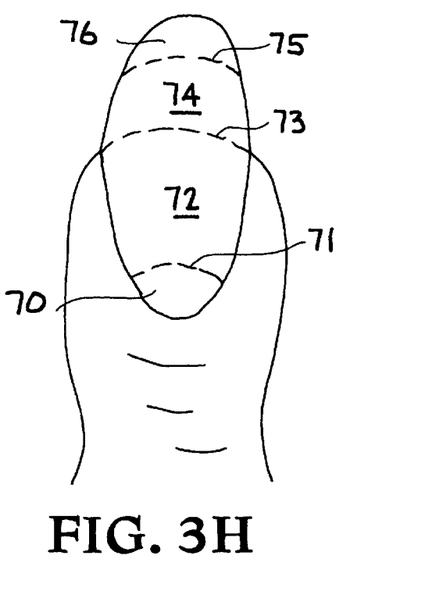

A unique advantage of the high-resolution fingernail surface imaging capability of the present invention is that it allows very sophisticated designs to be applied to the fingernail surface. For example, French nail designs separate the nail surface into three or four different areas that are painted differently. These areas are separated by anatomical boundaries or user defined boundaries that are typically smooth curves. FIGS. 3G and 3H illustrate how the fingernail surface might be separated into four different areas 70, 72, 74, 76. The boundaries for each area 71, 73, 75 are typically smooth curves with a shape that blends with the nail anatomical features such as the tip, the finger boundary, and the lunula. With presently available techniques, a high quality French nail design is very time consuming and expensive. In the present invention, computer software analyzes the fingernail images and accurately positions and shapes the desired boundaries automatically with minimal user input The user can easily vary the type of curve (e.g., circular, elliptical, parabolic, straight with rounded ends) and the exact position of each boundary. The user can then also select what color or color gradient or design is applied within each area. This automation significantly reduces the time and cost of applying French nail designs.

Figure 4B:
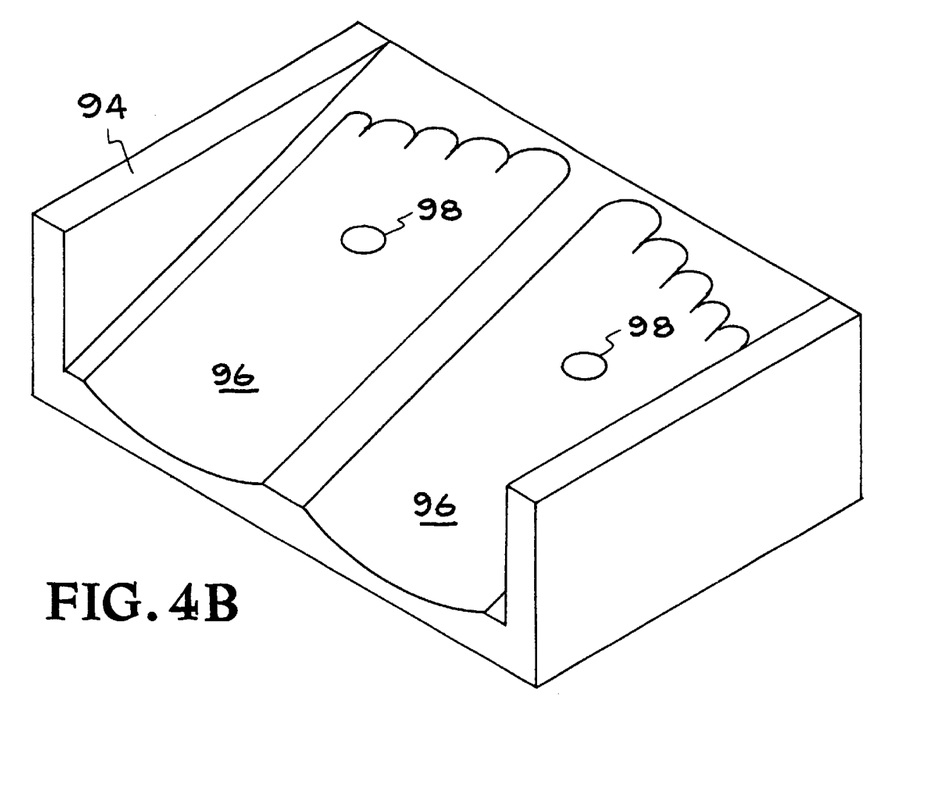
FIG. 4B show a holder with indentations for the toes and the soles of the feet.

FIGS. 4A and 4B each show different holder designs that can be placed in the device for decorating fingers or toes. The finger holder 80 has indentations 82 for the fingers to rest in comfortably. The depth of the indentations can be varied to account for the fact that the little finger is thinner than the middle or index finger. By having the little finger indentation be approximately 2–3 mm less than the middle finger indentation the nail surface for both fingers can be positioned at near identical heights. If the finger widths are significantly different, the user can decorate the fingers in pairs (i.e., both index fingers etc.) and optimize the holder height accordingly. Optional sensors 84 in the indentations are used to detect the presence of the finger. Due to human anatomy, it is impossible to place all ten fingers and thumbs with the nail surface in one plane. Therefore the thumbs are decorated separately and are positioned at the ends in indentations 86. An opening 88 in the holder can be used to place the thumbs when the fingers are being decorated. An optional restraint 90 can be used to immobilize the nails during decoration. With reference to FIG. 4B, the toe holder 94 has indentations 96 for the feet and toes and optional sensors 98. A variety of holders could be available and the user would select the size that best matches their digits.

Figure 5:
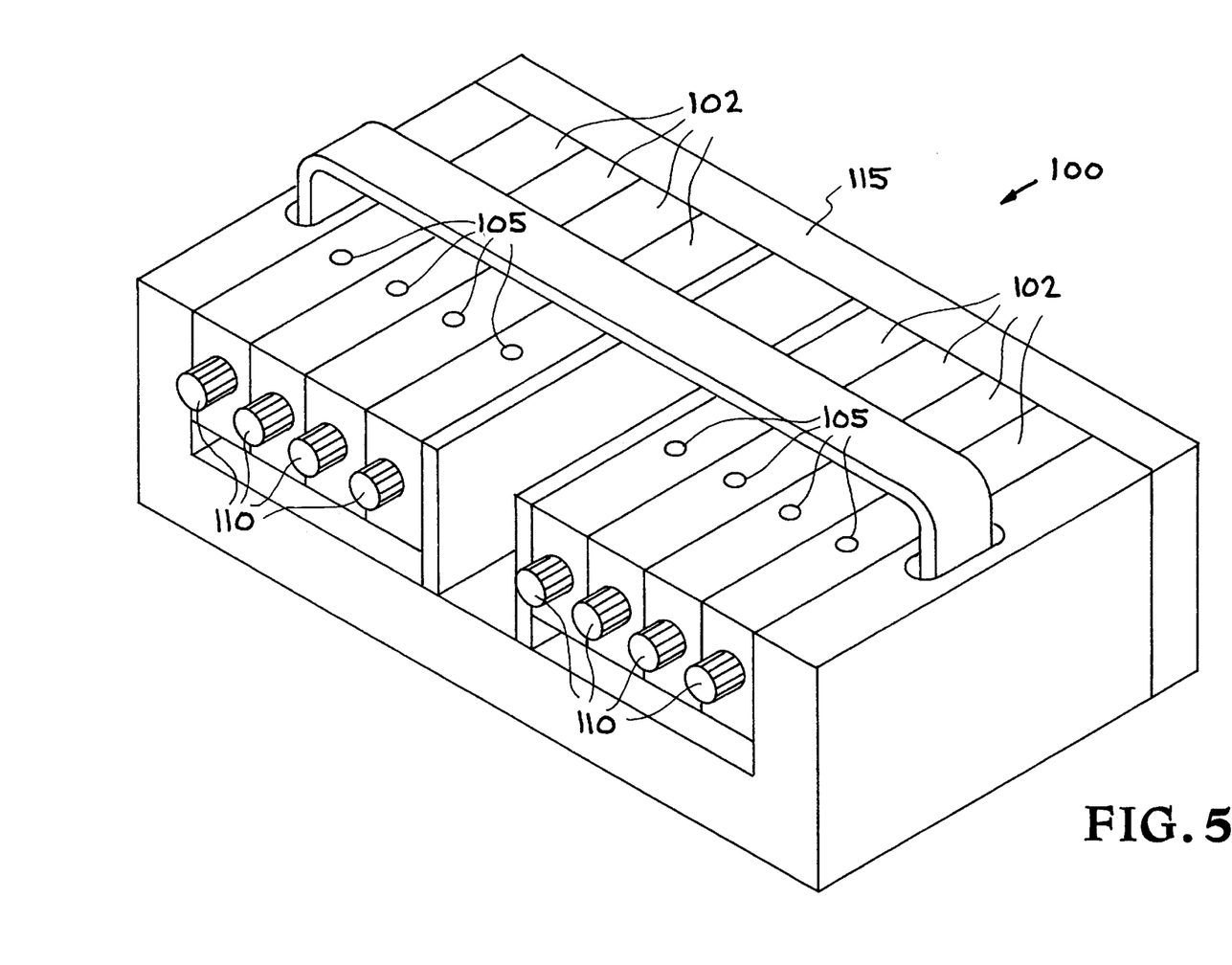
FIG. 5 shows a detailed view of an alternative holder design.
Figure 6:
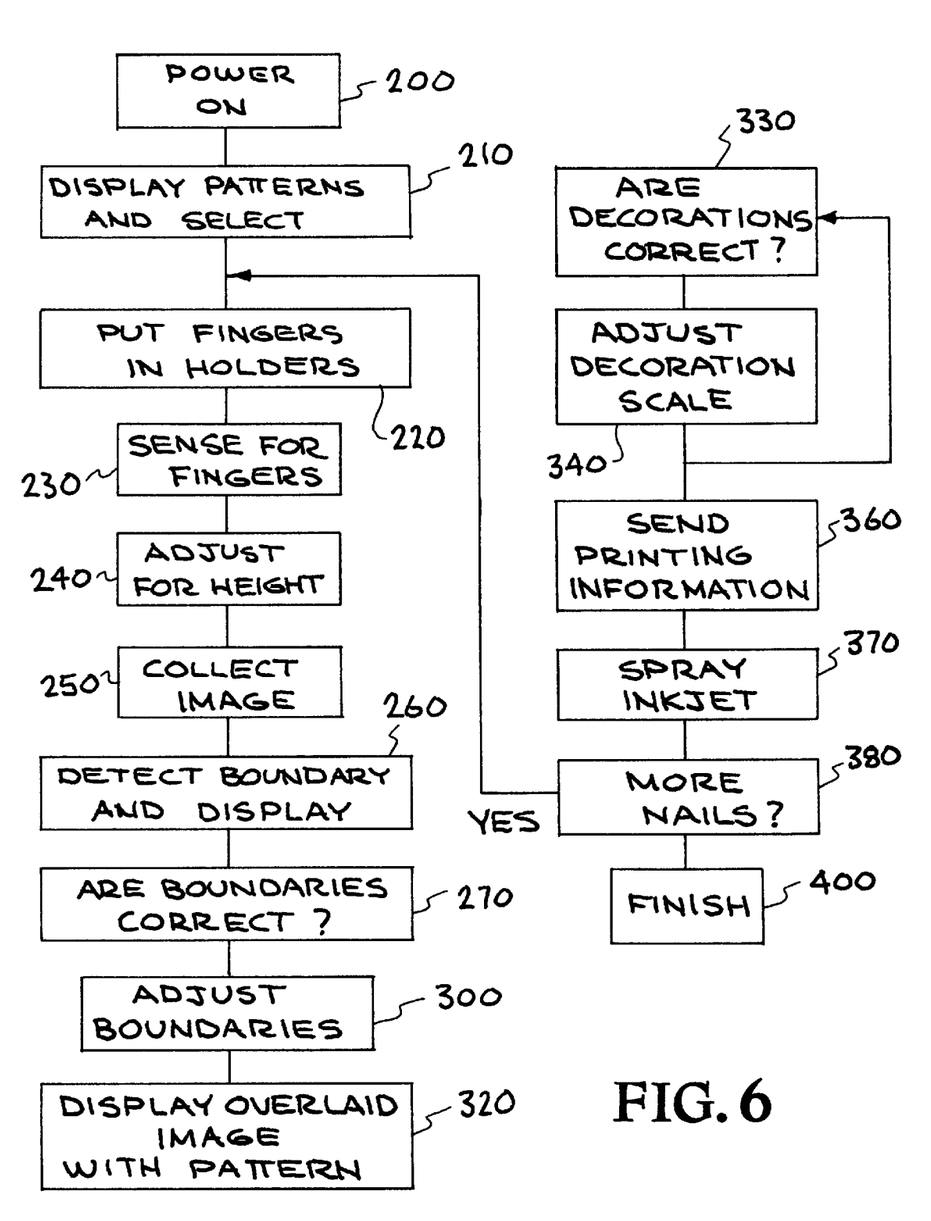
FIG. 6 presents a program for decorating nails with user-selected designs.

FIG. 5 shows an alternative holder design 100 that is segmented into eight different segments 102 that can move vertically independently. In this design the user places one finger or thumb on each segment and then the height of each segment is adjusted manually using adjustment knobs 110 until the fingernail surfaces for all fingers to be decorated are at the same optimum height Alternately, the segments 102 may be automatically actuated. The adjustment can be performed outside the nail-decorating device using a mechanical reference 115. In this case, once the holder 100 is adjusted outside the device the user can place the holder back on the holder stage in the device, as shown in FIG. 1, reposition their digits and then undergo the decoration process. Sensors 105 on each segment can be used to detect the presence of a digit FIG. 6 is a flow chart illustrating the operation of the preferred embodiment The device is powered on and the system initialized at block 200. The main program running on the computer 15 displays on the screen 12 a collection of possible designs which the user scans through using the keyboard 13 (or mouse) and selects the pattern for each digit as indicated in block 210. At block 210, the user also inputs any additional information necessary to apply the design. For example, if the design were a French nail design, the user would specify the different areas to be colored, what color or gradient to apply and what shape should be used to separate the different areas. At block 220, the computer 15 then displays on the screen 12 a message to position the fingers (or thumbs, or toes) in the holder. In block 230, the positions of the digits are verified in the holder 22. This verification can be performed by checking the signal from the sensors 84, 98 or 105 at each digit position or by a visual inspection by the user followed by pressing a key on the keyboard or clicking on an icon on the computer screen. When the digits are in the holder, the control system 14 then adjusts the holder height until the nail surface is at the optimum position as indicated in block 240. The control system 14 then collects the image from the camera 16 and stores it in memory at block 250. At block 260 the computer software then analyzes the image and identifies the digit axis and all the important anatomical boundaries of each nail (including outer boundary, boundary of lunula, and boundary of free edge of the nail at the end of the finger). The identified boundaries and user defined segment boundaries are then displayed on the screen 12 as colored lines that overlay the actual nail image. A user indicates to computer 15 whether he or she is satisfied with the identified boundaries at block 270. If not, then the process goes to block 300 where the user adjusts the boundary using the keyboard and/or mouse interface, or otherwise goes to block 320 where the computer displays on screen 12 a composite image of the digits overlaid with the desired decoration. The user then indicates to the computer 15 whether he or she is satisfied with the predicted decoration at block 330. If not, the process goes to block 340 where the user adjusts the decoration scaling and alignment for each nail using the keyboard and/or mouse interface. Otherwise, the process goes to block 360 where the computer 15 communicates printing information to the control system 14. The control system 14 then sends out the control signals that scan the inkjet print head 20 over all the digits to generate the desired decoration on each nail as indicated in block 370. If more fingers are to be printed, as indicated at block 380, the process goes back to block 220, or otherwise finishes at block 400.

Figure 7:
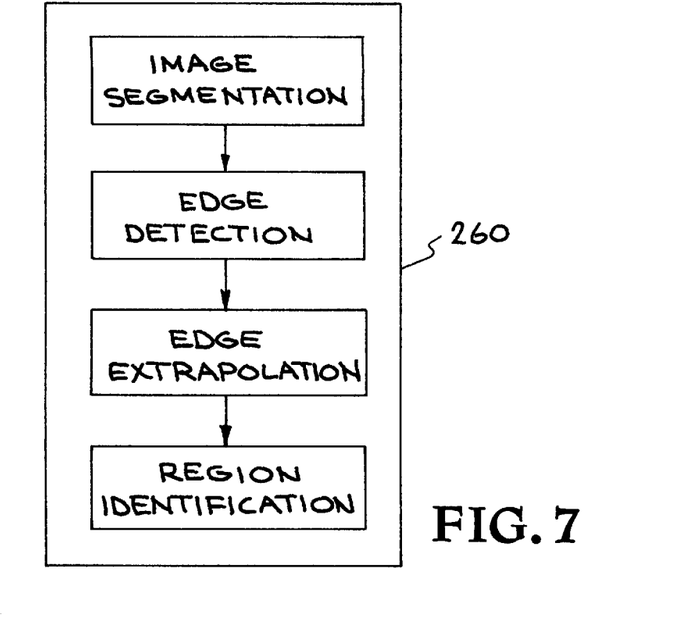
FIG. 7 illustrates block 260, which represents a significant component of the computer software that performs the printing.
Figure 8:
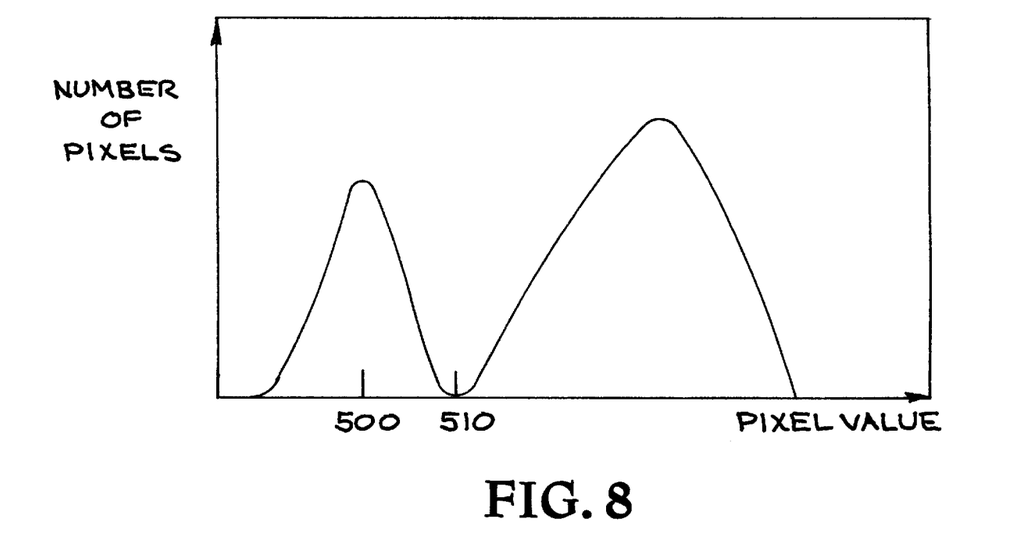
FIG. 8 shows a histogram of the number of pixels versus pixel intensity value calculated for a complete nail image.

Block 260 in FIG. 7 represents a significant component of the computer software that performs the printing. The key steps performed within this block are image segmentation, edge detection, edge extrapolation and region identification. In the first step, image segmentation, the software program identifies all the pixels that are background (i.e., part of the holder image) and all the pixels that are foreground (i.e., part of finger or toe). In the preferred embodiment of the present invention, the holders are colored black so that a simple threshold process can be used to identify all the background pixels with high accuracy. The appropriate threshold pixel value can be determined in several ways. In one embodiment, the threshold value is a constant value that is measured for each printing device and stored within the program to be used in all calculations. Alternatively, a histogram of the number of pixels versus pixel intensity value can be calculated for the complete image (see FIG. 8 for an example). This histogram is then analyzed to find the lowest pixel intensity that is a local maximum, position 500 in FIG. 8. The first minimum pixel intensity 510 is then selected as the threshold value. The program then labels all the pixels with values less than the threshold value as background and pixels with values greater than the threshold value as foreground or object pixels. In the program, the labeling is performed by creating an array of the same size as the image and storing an appropriate label, typically a number, in each pixel.

Figure 9A:
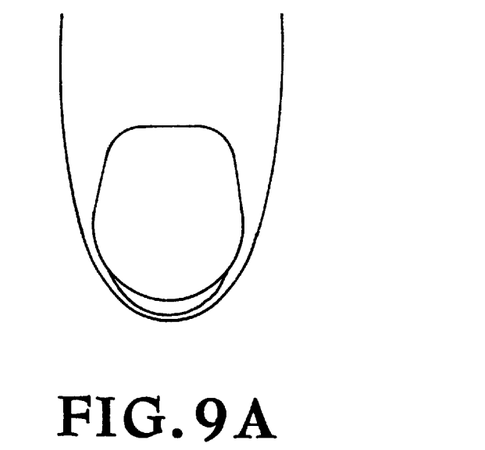
FIGS. 9A, 9B, 9C, respectively, show the initial image, the image generated by performing a Canny edge detection, the image generated by extrapolating the edges that shows the desired regions.
Figure 9B:
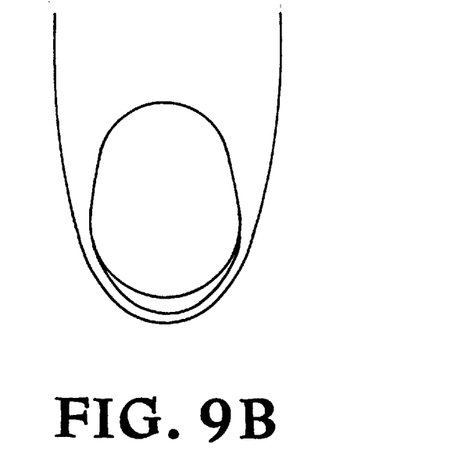
Figure 9C:
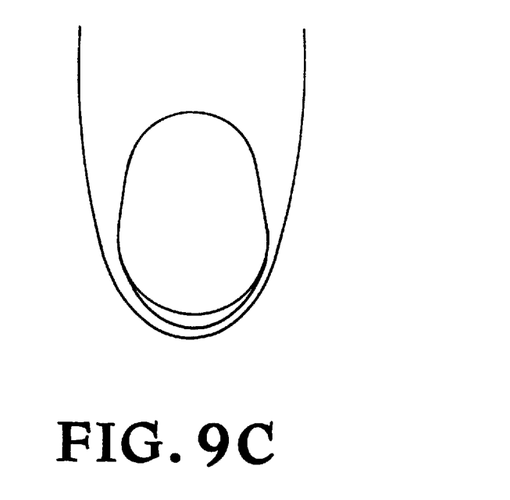
Figure 9D:
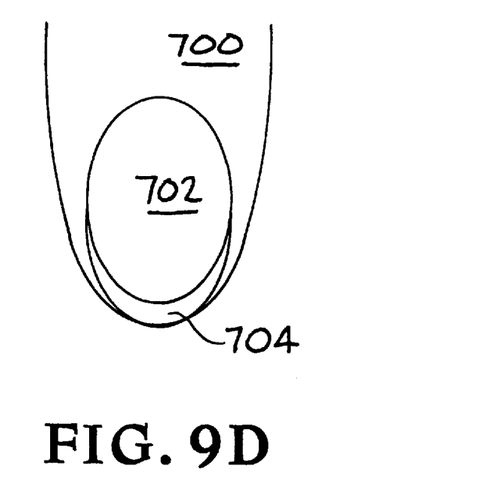
FIG. 9D shows the regions identified with Canny edge detection.

In the edge detection step of the image analysis, the software applies a Canny edge detection algorithm to generate a new image that identifies edge points. The Canny edge detection algorithm is a two-step process. In the first step the image is smoothed using a Gaussian blur. In the second step non-maximal-suppression is applied to the image first spatial derivative. The edge points are then linked using an extrapolation technique to link edge segments and points. In the final step of block 260, the resulting edge image is then analyzed by the software to identify the closed regions corresponding to the nail (region identification), and the tip of the nail that is unattached. Canny edge detection is well known in the art. Edge detection is described in U.S. Pat. No. 5,995,662 titled "Edge Detecting Method And Edge Detecting Device Which Detects Edges For Each Individual Primary Color And Employs Individual Color Weighting Coefficients" incorporated herein by reference. A description of the edge detection algorithm by J. Canny can be found in "Computational Approach To Edge Detection", IEEE Trans. on Pattern Analysis and Machine Int, November 1986, pp. 679–698, incorporated herein by reference. FIGS. 9A, 9B and 9C, show the initial image, the image generated by performing a Canny edge detection, the image generated by extrapolating the edges that shows the desired regions. FIG. 9D shows the finger 700, attached nail 702 and the nail end 704.

An alternative image analysis technique to identify the important nail regions employs a region based segmentation algorithm. In this algorithm the image is initially defined uniformly into a large number of small regions of the same pixel size and then the algorithm recursively merges adjacent regions based on the homogeneity of the two regions and the length of the boundary separating the two regions. Regions with similar average intensity or color and short boundaries have a higher probability of being merged. This region merging procedure stops when the desired number of regions have been identified. For accurate edges these techniques must start with a large number of small regions and consequently can take significant computational time.

Ink jet printing technology is well known, and ink jet printers are readily available. The ink jet print head contains an array of ink jet nozzles connected to ink chambers, which fire the ink at points on the nail as directed by the control system. The ink jets can be piezoelectric, magnetoelectric, or thermal. For the present application, the print head can be a relatively small array of nozzles and provide a small dot size for high-resolution designs. If the print head is not scanned, then the array of nozzles must be large enough to cover large nails.

The inks must be rapid drying and typically are black, cyan, magenta, and yellow. Special fluorescent inks are available that could be used for glow-in-the-dark designs. The wet design may be dried under drying means if needed, such as a heat lamp or blower. The dryer may be integrally connected to the nail printing device, as shown in FIG. 1, so that the nails are dried before being moved out of the device where air flow and dust could degrade the decoration. A pre-coat that improves ink absorption and protects or conditions the natural nail may be applied to the nails before printing the design, either using the ink jets or by conventional means. The pre-oat may also provide a more desirable background color for the printed design. The pre-coat color can be entered into the computer and used by the software to quickly detect the nail surface by isolating all areas matching the specified color. The pre-coat or primer may include anti-fungal or anti-bacterial agents to prevent fungal and other infections that can form on the nail. These agents may also be added to the inks that are used in the design.

An overcoat, preferably clear, may be applied to the printed design to protect it from scratches and damage. The overcoat may be applied using another printing cycle of the print head or by conventional means.

Although the present description has focused on applying the ink jet designs to natural nails, it can readily be appreciated that the designs may be applied to artificial nails, before or after being affixed to the natural nails.

The above descriptions and illustrations are only by way of example and are not to be taken as limiting the invention in any manner. One skilled in the art can substitute known equivalents for the structures and means described. The full scope and definition of the invention, therefore, is set forth in the following claims.

What is claimed is:

1. An apparatus for applying a design to at least one nail surface, comprising:
   means for positioning at least one nail surface;
   an ink jet print head; and
   means for controlling said ink jet print head to apply a design to said at least one nail, wherein said means for controlling said ink jet print head comprises a computer having a computer-useable medium embodying computer program code that analyzes the anatomy of said at least one nail surface and scales said design to fit said at least one nail surface.

2. The apparatus of claim 1, wherein said means for positioning said at least one nail surface comprises a holder for maintaining said at least one nail surface in proper position for said means for directing said ink jet print head to apply said design.

3. The apparatus of claim 2, wherein said holder comprises at least one indentation for a digit to which said at least one nail is attached, wherein said digit is selected from a group consisting of a finger, a thumb and a toe.

4. The apparatus of claim 3, wherein said holder comprises at least one sensor to detect the presence of said digit.

5. The apparatus of claim 3, wherein said holder comprises a restraint to immobilize said at least one nail.

6. The apparatus of claim 2, further comprising means for adjusting the height of said at least one nail surface with respect to said ink jet print head, wherein said adjusting means are operatively connected to said holder.

7. The apparatus of claim 6, wherein said adjusting means comprises a translation stage operatively driven by motors to place said at least one nail surface at an optimum distance from said ink jet print head.

8. The apparatus of claim 6, wherein adjusting means comprises a mechanical drive to manually place said at least one nail surface at an optimum distance from said ink jet print head.

9. The apparatus of claim 6, wherein said adjusting means comprises a mechanical reference that is placed temporarily above the fingers and contacts the fingers when they are at an optimum distance from said ink jet print head.

10. The apparatus of claim 6, wherein said adjusting means comprises a combination of means for providing a light beam and at least one optical detector that are operatively located on either side of said holder such that said light beam crosses above said at least one nail surface and hits said at least one optical detector when said at least one nail surface is below an optimum distance from said ink jet print head, wherein a portion of said light beam is blocked when said at least one nail surface is at an optimum distance from said ink jet print head.

11. The apparatus of claim 10, wherein said light beam is collimated.

12. The apparatus of claim 6, wherein said adjusting means comprises means for adjusting the distance of said at least one nail surface from said ink jet print head until said at least one nail surface is in focus.

13. The apparatus of claim 3, wherein said holder comprises indentations for a left hand and a right hand, including the palm, fingers and thumb of each hand.

14. The apparatus of claim 3, wherein said holder comprises indentations for a left foot and a right foot, including the sole and toes of each foot.

15. The apparatus of claim 3, further comprising means for moving said at least one nail surface and/or said ink jet print head relative to one another.

16. The apparatus of claim 3, wherein said means for moving comprises means for moving said at least one nail surface and/or said ink jet print head in three dimensions relative to said at least one nail surface and/or said ink jet print head.

17. The apparatus of claim 1, wherein said ink jet print head comprises an array of ink jet nozzles connected to ink chambers, wherein each nozzle of said array is configured to fire ink at points on said at least one nail as directed by said means for directing said ink jet print head.

18. The apparatus of claim 17, wherein said each nozzle is selected from a group consisting of a piezoelectric ink jet nozzle, a magnetoelectric ink jet nozzle and a thermal ink jet nozzle.

19. The apparatus of claim 1, wherein said means for controlling said ink jet print head to apply a design to said at least one nail comprises:
   an optical system to acquire an image of said at least one nail surface;
   a control system operatively connected to said computer and said optical system and said print head, wherein said control system communicates the settings of said optical system and said print head to said computer, wherein said control system communicates said image to said computer and directs said ink jet print head to apply said design to said at least one nail surface; and
   a monitor connected to said computer to display said at least one nail surface and said design.

20. The apparatus of claim 19, further comprising an electronic camera operatively connected to said optical system.

21. The apparatus of claim 20, wherein said electronic camera comprises a charge-coupled device.

22. The apparatus of claim 19, wherein said computer program code analyzes said anatomy of said at least one nail surface by executing the steps of:
   segmenting said image to identify all pixels that are background (i.e., part of the holder image) and all the pixels that are foreground (i.e., part of said at least one nail surface;

detecting the edge of said at least one nail surface to generate a new image that identifies edge points;

extrapolating the edge of said at least one nail surface by linking said edge points to produce a resulting image; and identifying a region of interest of said at least one nail surface by identifying a closed region of said resulting image.

23. The apparatus of claim 22, wherein said step of segmenting comprises a simple threshold process that can be used to identify all said background pixels with high accuracy.

24. The apparatus of claim 23, wherein said threshold is a constant that is measured and stored for said apparatus.

25. The apparatus of claim 23, wherein said threshold is determined from a histogram of the number of pixels versus pixel intensity values of said image calculated for a complete image, wherein said histogram is then analyzed to find the lowest pixel intensity that is a local maximum, wherein a minimum pixel intensity is then selected as the threshold value, wherein said program code then labels all said pixels with values less than said threshold value as background and all pixels with values greater than said threshold value as foreground pixels.

26. The apparatus of claim 23, wherein the step of detecting the edge of said at least one nail surface to generate a new image that identifies edge points applies a Canny edge detection algorithm to generate a new image that identifies edge points.

27. The apparatus of claim 1, further comprising means to provide input to said program code to manipulate the position and shape of said design.

28. The apparatus of claim 1, further comprising mean for selecting said design.

29. The apparatus of claim 28, wherein said means for selecting a design is selected from a group consisting of a keyboard, a mouse, a touchpad, joy stick and voice recognition.

30. The apparatus of claim 1, wherein said design is selected from a group consisting of a digital art design, a digitized picture, a logo, text, a French nail design, a colored pattern and a graded pattern.

31. The apparatus of claim 20, wherein said camera and said optical system image a region that is at least 8 inches by 2 inches with each pixel covering an area of at most 0.01 inches by 0.01 inches.

32. The apparatus of claim 2, wherein said ink jet print head comprises a scanning plane, wherein said indentation positions said at least one nail surface to be approximately parallel to said scanning plane.

33. The apparatus of claim 3, wherein said means for moving comprises means for moving said at least one nail surface and/or said ink jet print head in two dimensions relative to said at least one nail surface and/or said ink jet print head.

34. The apparatus of claim 1, further comprising means for drying said design.

35. The apparatus of claim 19, wherein said computer program code analyzes said anatomy of said at least one nail surface by identifying nail boundaries.

36. The apparatus of claim 35, wherein said nail boundaries are selected from a group consisting of a nail outer boundary, a boundary of a lunula and a boundary of a free edge of said at least one nail.

37. The apparatus of claim 23, wherein said means for positioning said at least one nail comprises a holder that is painted black.

38. A method for applying a design to at least one nail surface, comprising:

positioning at least one nail surface in operative proximity to an ink jet print head;

analyzing the anatomy of said at least one nail surface to produce an analyzed nail surface;

scaling a design to fit said analyzed nail surface to produce a scaled design; and applying said scaled design to said analyzed nail surface.

39. The method of claim 38, wherein the step of positioning said at least one nail surface comprises maintaining said at least one nail surface in proper position for the step of analyzing the anatomy of said at least one nail surface to produce an analyzed nail surface.

40. The method of claim 38, wherein the step for positioning said at least one nail surface comprises maintaining said at least one nail surface in proper position for the step of scaling a design to fit said analyzed nail surface to produce a scaled design.

41. The method of claim 38, wherein the step for positioning said at least one nail surface comprises maintaining said at least one nail surface in proper position for the step of applying said scaled design to said analyzed nail surface.

42. The method of claim 38, further comprising sensing the presence of digit to which said at least one nail is attached, wherein said digit is selected from a group consisting of a finger, a thumb and a toe.

43. The method of claim 38, further comprising restraining said at least one nail.

44. The method of claim 38, wherein the step of positioning said at least one nail surface in operative proximity to an ink jet print head includes adjusting the height of said at least one nail surface with respect to said ink jet print head.

45. The method of claim 38, further comprising moving said at least one nail surface and/or said ink jet print head relative to one another.

46. The method of claim 45, wherein the step of moving said at least one nail surface and/or said ink jet print head relative to one another comprises moving said at least one nail surface and/or said ink jet print head in up to three dimensions relative to said at least one nail surface and/or said ink jet print head.

47. The method of claim 38, wherein the step of analyzing the anatomy of said at least one nail surface to produce an analyzed nail surface comprises:

segmenting said image to identify all pixels that are background (i.e., part of the holder image) and all the pixels that are foreground (i.e., part of said at least one nail surface;

detecting the edge of said at least one nail surface to generate a new image that identifies edge points;

extrapolating the edge of said at least one nail surface by linking said edge points to produce a resulting image; and identifying a region of interest of said at least one nail surface by identifying a closed region of said resulting image.

48. The method of claim 47, wherein said step of segmenting comprises a simple threshold process can be used to identify all said background pixels with high accuracy.

49. The method of claim 48, wherein said threshold is a constant that is measured and stored for said ink jet print head.

50. The method of claim 48, wherein said threshold is determined from a histogram of the number of pixels versus pixel intensity values of said image calculated for a complete image, wherein said histogram is then analyzed to find the lowest pixel intensity that is a local maximum, wherein a minimum pixel intensity is then selected as the threshold value, wherein said program code then labels all said pixels with values less than said threshold value as background and all pixels with values greater than said threshold value as foreground pixels.

51. The method of claim 47, wherein the step of detecting the edge of said at least one nail surface to generate a new image that identifies edge points applies a Canny edge detection algorithm to generate a new image that identifies edge points.

52. The method of claim 38, further comprising providing manipulating the position and shape of said design.

53. The method of claim 38, further comprising selecting said design.

54. The apparatus of claim 53, wherein the step of selecting a design includes selecting a design using an article selected from a group consisting of a keyboard, a mouse, a touchpad, joystick and voice recognition.

55. The method of claim 53, wherein the step of selecting a design includes selecting a design from a group consisting of a digital art design, a digitized picture, a logo, text, a French nail design, a colored pattern and a graded pattern.

56. The method of claim 38, further comprising drying said design.

57. The method of claim 38, wherein the step of analyzing the anatomy of said at least one nail surface to produce an analyzed nail surface comprises identifying nail boundaries.

58. The method of claim 57, wherein said nail boundaries are selected from a group consisting of a nail outer boundary, a boundary of a lunula and a boundary of a free edge of said at least one nail.

59. The method of claim 38, further comprising applying a pre-coat to said at least one nail before applying said design.

60. The method of claim 38, further comprising segmenting the nail into several regions and decorating each region of said several regions as desired.

61. The method of claim 38, further comprising applying an overcoat to the nail after applying the design.

62. The apparatus of claim 19, wherein said computer program code analyzes said anatomy of said at least one nail surface by identifying the important nail regions with a region based segmentation algorithm.

63. The apparatus of claim 62, wherein said region based segmentation algorithm comprises the steps:

defining the image uniformly into a large number of small regions of the same pixel size;

determining a desired number of regions to identify;

recursively merging adjacent regions based on their homogeneity and the length of their boundary, wherein regions with similar average intensity or color and short boundaries have a higher probability of being merged; and stopping the step of recursively mergin adjacent regions when said desired number of regions have been identified.

64. The method of claim 38, wherein the step of analyzing the anatomy of said at least one nail surface to produce an analyzed nail surface comprises analyzing said anatomy of said at least one nail surface by identifying the important nail regions with a region based segmentation algorithm.

65. The method of claim 64, wherein said region based segmentation algorithm comprises the steps:

defining the image uniformly into a large number of small regions of the same pixel size;

determining a desired number of regions to identify;

recursively merging adjacent regions based on their homogeneity and the length of their boundary, wherein regions with similar average intensity or color and short boundaries have a higher probability of being merged; and stopping the step of recursively mergin adjacent regions when said desired number of regions have been identified.

* * * * *